Jan. 22, 1963  E. ATTWOOD  3,074,889
UNINFLAMMABLE HYDRAULIC FLUIDS
Filed May 20, 1959
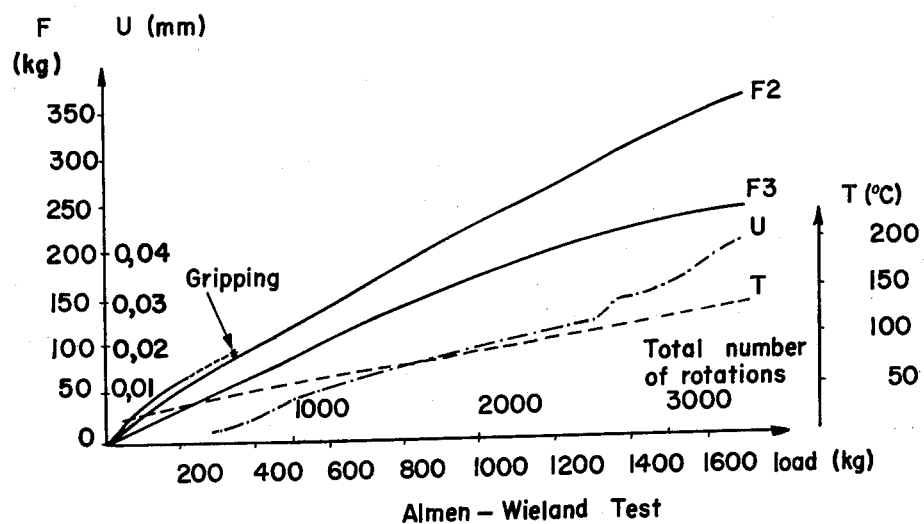
Almen — Wieland Test
INVENTOR.
Edmund Attwood
BY
Michael S. Striker
Attorney

United States Patent Office 3,074,889
Patented Jan. 22, 1963

3,074,889
UNINFLAMMABLE HYDRAULIC FLUIDS
Edmund Attwood, Winchmore Hill, London, England, assignor to Labofina, Brussels, Belgium
Filed May 20, 1959, Ser. No. 814,451
Claims priority, application Great Britain May 23, 1958
10 Claims. (Cl. 252—78)

This invention relates to uninflammable hydraulic fluids suitable for use in hydraulic systems, instruments, hydraulic transmissions, etc. More particularly, the present invention is concerned with hydraulic fluids based on triaryl phosphates which exhibit a unique combination of desirable properties.

Hydraulic fluids are subjected to particularly high pressures during their use in view of the functions which they have to perform. As a result, a leak in the hydraulic system where these fluids are used is likely to lead to an ejection of the fluid which may take the form of an oil mist. Consequently, there exists the danger of an inflammation of the oil and even an explosion hazard when machine parts or materials heated to high temperatures are in the immediate vicinity of the hydraulic system. In practice, this case occurs very frequently, for example in steel mills, particularly in rolling or flattening and shaping operations as well as in the pressing, stamping and punching of metal pieces. Therefore, the property of being uninflammable is highly desirable for hydraulic fluid.

The following properties are generally desired of a hydraulic fluid:

Lubricating properties such as a viscosity adapted to the application, slight changes in the viscosity with changes in the temperature and good film strength;
Resistance to flames as provided by low vapor pressure and a high flash point;
Good chemical qualities such as resistance to deterioration and chemical inertness to the components of hydraulic systems; and
Certain special properties such as a negligible compressibility and non-toxicity.

Numerous compositions have been proposed for use as uninflammable hydraulic fluids.

After attempting to impart the missing fire-resistant properties to oils based on petroleum by incorporation of oxidation inhibitors, such as diphenyl amine or lead tetra-ethyl or various flame-proofing agents, the oil industry proposed various formulations which met with more or less success. These formulations can be divided into five large classes.

Aqueous compositions
Glycols and derivatives
Silicones
Chlorinated derivatives
Organic phosphates The first mentioned materials have limited applicability in view of the low boiling temperature of water. Accordingly, they cannot be used at high temperatures. Furthermore, the film strength of these materials is insufficient and therefore they are unsuitable for use in certain types of pumps.

The second class of materials suffers from the disadvantage of great changes in viscosity at low temperatures. Also, the freezing point of these compositions is unusually high. Furthermore, they are very susceptible to oxidation although they can be quite easily protected by the addition of anti-oxidants.

The silicones have a poor film strength.

The properties of the chloro derivatives vary depending on their chemical structure. The majority of these materials are highly corrosive. Other limitations exist where it was possible to reduce the corrosiveness. These limitations include large changes in viscosity with changes in temperature, and a high solvent power for rubber parts of the hydraulic system.

The organic phosphates or rather a great number of individual members of this class were studied extensively. As a result, there were found large groups of alkyl phosphates, aryl phosphates, alkyl aryl phosphates and mixed phosphates which proved to have some satisfactory properties.

Organic esters of phosphoric acid are the most frequent members of this class but esters of other acids of phosphorus, such as the phosphites and phosphonates, were also proposed for use and applied alone or in mixtures.

Among the phosphates, the tertiary ones are the most frequently used materials. Theoretically, all these phosphates may be suitable but certain physical properties such as the solidification point, the boiling point and the volatility, impose limitations on these compounds which render it necessary to carefully select the size of the hydrocarbon radicals. The corrosive action of these materials, which is due to a hydrolysis of the esters, varies from compound to compound but places also a practical limitation on these compositions. Of the various possible substituents, the aromatic substituents proved to be the best with respect to the elimination of aggressiveness towards metals.

Representative examples of trialkyl phosphates include the phosphates whose alkyl radicals contain 4 to 12 carbon atoms, such as trihexyl phosphate, triamyl phosphate, tridodecyl phosphate, and the branched isomers thereof as well as cyclic homologues, such as the tricyclohexyl phosphate and the tri 2-ethyl hexyl phosphate.

The group of the aryl and alkyl aryl phosphates is represented for example, for triphenyl phosphate, tricresyl phosphate, trixylenyl phosphate, diphenyl xylenyl phosphate, and diphenyl cresyl phosphate.

Examples of mixed phosphates include the dioctyl phenyl phosphate, butyl cresyl octyl phosphate and dibutyl cresyl phosphate.

The properties of some of these phosphates are listed in Table I.

TABLE I

| Name | Structure | Molecular | Density at 20° C. | Viscosity in centipoises at 20° C. | F. P., ° C. | Manufacturer | References |
|---|---|---|---|---|---|---|---|
| Tri-n-butyl-phosphate | $(C_4H_9-O)_3 \equiv PO$ | 266 | 0.978 | 3.4 | | Comm. Solv. Co. | Kirk. |
| Tri(butyl-cellosolve) phosphate | $(C_4H_9-O-CH_2-CH_2-O)_3 \equiv PO$ | 398 | 1.022 | 12.2 | | Ohio | Do. |
| Tri (2-ethyl-hexyl) phosphate | $(C_8C_{17}-O)_3 \equiv PO$ | 436 | 0.926 | 14.1 | | Carbide | Do. |
| Tri-chlor-ethyl-phosphate | $(ClCH_2-CH_2O)_3 \equiv PO$ | 285 | 1.41 | 44 | −58 | Hoechst, Bayer | |
| Tri-phenyl-phosphate | $(C_6H_5O)_3 \equiv PO$ | 326 | 1.268 | | +49.9 | Dow, Mon., Bayer. | Do. |
| Cresyl-diphenyl-phosphate | $(C_6H_5O)_2 \cdot (C_6H_4CH_3-O) \equiv PO$ | 340 | 1.208 | 39.8 | −40 | Mon | Do. |
| Tri-cresyl-phosphate | $(CH_3 \cdot C_6H_4-O)_3 \equiv PO$ | 368 | 1.17 | 90 | −34 | Bayer, Hoechst | |
| Di-phenyl-xylyl-phosphate | $((C_6H_5)_2(CH_3)_2C_6H_3O) \equiv PO$ | 354 | 1.19 | 70 | −32 | Bayer | |
| Tri-xylyl-phosphate | $(CH_3)_2-C_6H_3O_3 \equiv PO$ | 410 | 1.14 | 230 | | Hoechst | |
| 2-ethyl-hexyl-diphenyl-phosphate | $(C_8H_{17}O)(C_6H_5O)_2 \equiv PO$ | 362 | 1.092 | 21 | | Mon | Do. |
| O-xenyl-diphenyl-phosphate | $(C_6H_5-C_6H_4O)(C_6H_5O)_2 \equiv PO$ | 402 | 1.233 | 30 | | Dow | Do. |
| Tri(p-ter-butyl-phenyl) phosphate | $(C_4H_9-C_6H_4-O)_3 \equiv PO$ | 495 | | | +95 | Dow | Do. |

Unfortunately, these organic phosphates have a very unsatisfactory viscosity index. Furthermore, they have sometimes a poor film strength, which results in unusually high wear in certain types of apparatus such as gear pumps.

It is therefore an object of the present invention to provide hydraulic fluids which avoid the shortcomings of the known hydraulic fluids.

Another object of the present invention is to provide hydraulic fluids having a low volatility (see French Patent No. 1,104,423 page 2, and Rev. Prod. Chim., 61 (1249), page 207 (31/5/1958)).

A further object of this invention is to provide hydraulic fluids having maximum fire resistance.

Still another object of the present invention is to provide hydraulic fluids the viscosities of which meet the usual specifications, i.e. 150 to 300 SSU at 100° F. (see British Patent 671,403).

A further object of the present invention is to provide hydraulic fluids having reduced corrosiveness.

A further object of the present invention is to provide hydraulic fluids exhibiting the exceptional combination of a high viscosity index, a high film strength and a viscosity range permitting to meet practically all specifications, i.e. 150 to 1200 SSU at 100° F. (see British Patent 712,062, page 2, first column, line 55).

Still further objects will appear hereinafter.

With the above objects in view, the present invention provides hydraulic fluids comprising a major proportion of an aryl phosphate and minor proportions of a medium molecular weight vinyl copolymer and of a halogenated alkyl phosphate.

In accordance with a preferred embodiment of the present invention, there is provided a hydraulic fluid which comprises at least about 80%, preferably about 90 to 95% by weight of a triaryl phosphate, about 5 to 10% by weight of a chlorinated alkyl phosphate containing less than 8 carbon atoms per alkyl group, and up to about 5% by weight of a vinyl chloride-vinyl acetate copolymer, said copolymer having a molecular weight within the range of 5,000 to 25,000 and cantaining about 80 to 90% by weight of chloride and about 10 to 20% by weight of acetate.

Any suitable aryl phosphate may be used in the practice of the invention, the term "aryl" designating a radical which contains an aromatic nucleus regardless of the existence, the position and the nature of side chains.

Some of the aryl phosphates suitable for formulating the hydraulic fluids of the present invention have already been named and include triphenyl phosphate, tricresyl phosphat (T.C.P.), diphenyl xylenyl phosphate, and trixylenyl phosphate. Other known aryl phosphates which can be used are: dicresyl phenyl phosphate, diphenyl cresyl phosphate, diphenyl ethyl phenyl phosphate, and diphenyl ortho xenyl phosphate.

The radicals quoted have the following structures:

Cresyl or tolyl: $CH_3-(C_6H_5)-$

Phenyl: $(C_6H_5)-$

Xylenyl or xylyl: $CH_3$
$\diagdown$
$(C_6H_5)-$
$\diagup$
$CH_3$

Etryl phenyl: $C_2H_5-(C_6H_5)-$

Ethyl phenyl: $C_2H_5-(C_6H_5)-$

The triphenyl phosphate can normally not be used because it is solid at ordinary temperature.

The tricresyl phosphate is certainly the best known ester phosphate. The commercial tricresyl phosphate is a mixture of tri ortho cresyl phosphate, tri meta cresyl phosphate, tri para cresyl phosphate, and mixed phosphates in which the tri ortho cresyl phosphate predominates and in which the mixed phosphates are present in minor quantities. It should be noted that ortho cresyl phosphate is considered to be somewhat toxic (see British Patent 681,357) and that the mixtures of the para-meta isomers are preferable to ortho cresyl phosphates. The paracresyl phosphate, however, has a substantially higher melting point. If harmful effects due to a low melting point are to be avoided, one has to use the pure para isomer or the xylyl, xenyl or phenyl derivatives.

The diphenyl xylenyl phosphate is certainly a very useful phosphate because it is not toxic and satisfactory from the standpoint of its physicochemical characteristics, which are very close to those of tricresyl phosphate.

The trixylenyl phosphate is like wise non-toxic but it has a higher viscosity at 20° C. than TCP. It is also less known.

The other phosphates cited above are likewise not available in large quantities and therefore more difficult to utilize. Nevertheless, there exists an interest in these compounds and our experiments have shown that they are capable of replacing advantageously the above-described phosphates.

The list of phosphates given is not to be considered as limiting the present invention but intended to show some representative members of the class consisting of the triaryl phosphates to which we refer.

The vinyl polymer used in the practice of this invention is distinguished by a combination of particular properties.

(1) Its miscibility with the other components and in particular with the triaryl phosphate generally representing more than 80% of the composition.

(2) Its pronounced effect on the viscosity-temperature curve; more particularly, the important increase in the viscosity index produced by this material. The viscosity index is a measure of the change in viscosity observed between two standard temperatures, i.e., 100° F. and 210° F., using two standard samples of pure mineral oils, one of these oils showing a minimum variation and having a viscosity index of 100 and the other oil showing a maximum variation and having a viscosity index of 0, the viscosity at 210° F. being the same for both oils.

(3) Its elevated intrinsic viscosity in the ester phosphate, i.e. its important thickening effect at low and medium temperatures, which makes it possible to cover a wide range of viscosities by small additions of the polymer.

(4) Its beneficial effect on the film strength of the composition.

(5) Its good resistance to mechanical stress.

Experience has shown that it is very difficult to find such a polymer which is miscible with the aryl phosphates and the molecular weight of which is within the range of 5,000 to 25,000, considered to be the optimum range by the one skilled in the art.

In order to solve the problem of solubility, some authors have proposed the use of a third solvent (solutizer) such as the chlorinated biphenyls and the alkyl phosphates with a lower molecular weight. Other authors have defined structural conditions to be met by homo or copolymers of acrylic compounds in order to obtain a good miscibility without losing the effect on the viscosity index.

In fact, the effect on the viscosity index is somewhat in disagreement with the miscibility because this effect is, in the final analysis, accounted for by variations in the solubility with changing temperature. The increase in solubility with rising temperature is accompanied by an unwinding (straightening) of the polymer molecules which in this form exhibit a maximum activity in the homogenous system; in particular there is obtained a maximum intrinsic viscosity or, stated differently, the strongest thickening effect.

At low temperature the molecule contracts to a point where it changes from the dissolved state to the dispersed state, thus giving a reduced viscosity and sometimes even a very small viscosity. In other words, the thickening effect is considerably smaller than at high temperatures, if not zero.

Accordingly, there is no superimposition of two inverse viscosity curves but an increase in the thickening effect with rising temperature and, as a result, a decrease in viscosity differences due to an indirect effect.

It is by no means surprising in this situation that a group of well-defined polymers must have a particular structure in order to obtain a thickening effect and a substantial improvement of the viscosity index.

In particular, it is not at all surprising that compounds used for improving the viscosity index of mineral oils cannot be utilized for the same purpose with organic phosphates and, in particular, aryl phosphates.

We have indicated hereinabove the optimum range of 5,000 to 25,000 for the molecular weight. It is generally recognized that a molecular weight of 5,000 must be reached in order for the polymer to exercise a sufficient influence on the viscosity index of the fluid base material. On the other hand, it is generally accepted that the polymer must have a molecular weight lower than 25,000 and, if possible, lower than 15,000 in order to exhibit a good resistance to breakage, i.e. degradation by mechanical action.

Within the above range of molecular weights, certain homologues of some series of polymers give satisfactory results in the absence of a third solvent with triaryl phosphates, such as tricresyl phosphates.

Thus, it was shown that there exists an optimum number of carbon atoms in the alkyl chains of alkyl poly acrylates (see French Patent 1,138,794) and that outside this range the effect on the viscosity index decreases or complete insolubility of the polymer is observed.

Numerous other polymers have been described as being capable of beneficially acting on the viscosity index but the experience has shown that these products are effective only if used with a third solvent (solutizer). Thus, an alkylated polystyrene of a molecular weight of 60,000 can be used with a mixture of TCP and chlorinated diphenyl, said mixture containing 40% TCP.

Polyisobutylene was also described as being suitable for use in mixtures of organic phosphates containing in addition to a triaryl phosphate 65 to 85% of a trialkyl phosphate, the alkyl group of which has less than 12 carbon atoms (see British Patent 692,172).

The polyoctyl methacrylate of the molecular weight 10,000, sold by Rohm & Haas under the designation Acryloid HF 855, can also be used with a mixture of organic phosphates containing in addition to tricresyl phosphate 80% of trioctyl phosphate (see British Patent 671,408 and Ind. Eng. Chem. (1951)).

The same product can also be used with a mixture of TCP and chlorinated diphenyl known by the trade name Aroclor 1248 (Monsanto) containing 48% of diphenyl (see British Patent 744,544).

However, it has been found that all these products when combined with tricresyl phosphate without a third solvent are incompatible with the latter and therefore inoperative.

The same is true of polyvinyl chloride, polyvinyl acetate and polyvinyl butyral when using materials having a molecular weight within the range of 5,000 to 15,000.

Very surprisingly, it has now been found in accordance with the present invention that copolymers of vinyl chloride and vinyl acetate containing about 80 to 90% by weight of the chloride and about 10 to 20% by weight of the acetate are completely compatible with tricresyl phosphate without the aid of a third solvent (solutizer) and that these copolymers are at the same time very effective as viscosity index improvers and thickening agents. Furthermore, these copolymers confer extreme pressure properties to hydraulic fluid compositions.

The halogenated alkyl phosphates used in the practice of the instant invention are characterized by the presence of a sufficiently labile halogen atom, preferably chlorine. Representative examples of such compounds are alkyl phosphates, the alkyl groups of which are formed by relatively short chains containing halogen substituents, such as for example trichloro ethyl phosphate.

This product does not act as a third solvent (solutizer) since solubility experiments with the polymer have shown that compatibility exists also in the absence of this product. The function of this material is an extreme pressure effect.

Very surprisingly, we have found that the combination of the trichloro ethyl phosphate with the above defined vinyl chloride/vinyl acetate copolymer results in an unexpected increase in the extreme pressure properties of the composition and brings about a remarkable and unexpected decrease in wear.

In fact, it has been found in accordance with this invention that the individual effects of the trichloro ethyl phosphate and the vinyl chloride/vinyl acetate copolymer are rather limited whereas the combination of the two products makes it possible to considerably exceed the resistance to seizure (as measured with the 4-ball EP tester) and the antiwear properties brought about by the individual components. This indicates an unexpected synergistic effect.

It follows from the above that the hydraulic fluid composition of the present invention exhibits a combination of properties distinguishing it over the known formulations.

The proportions of the components of the hydraulic fluids of the present invention can be derived quite easily from the above disclosure.

As stated above, the triaryl phosphate is the major component. It is preferably present at a concentration of at least about 80% by weight and even more preferably at a concentration between about 90 and 95% by weight.

The halogenated alkyl phosphate is used in an amount sufficient to produce the desired extreme pressure effect as well as a decrease in wear. It has been found in accordance with this invention that the most preferable concentration of trichloro ethyl phosphate ranges from about 5 to about 10% by weight.

The polymer is added in the amount required to obtain the desired viscosity. It is advisable to avoid concentrations above about 5% by weight which could have an adverse effect on the fire resistance.

If high viscosities are required, copolymers of the highest molecular weight (within the range specified above) are used because they produce the greatest thickening effect.

Table II lists the viscosities, expressed as degrees Engler at 50° C., of mixtures of tricresyl phosphate with various quantities of the copolymer.

TABLE II

| Amount of polymer in percent by weight | Polymer: 87 Cl 13 ac, mol. weight 6,000 | Polymer: 87 Cl 13 ac, mol. weight 10,000 | Polymer: 90 Cl 10 ac, mol. weight 16,000 | Polymer: 90 Cl 10 ac, mol. weight 24,000 |
|---|---|---|---|---|
| 0 | 2.8 | 2.8 | 2.8 | 2.8 |
| 1 | 3.4 | 4.2 | 4.5 | 5.4 |
| 2 | 4.4 | 6.5 | 7.3 | 11 |
| 3 | 5.4 | 10.5 | 13 | 18.6 |

NOTE.—Cl=chloride, ac=acetate.

To the basic formulation of the present invention known additives, such as corrosion inhibitors, may be added, if desired. These additives confer their known properties to the novel formulation without in any way changing the character of this invention.

The present invention contemplates also the presence of minor amounts of functional groups of substituents in the copolymer, such as maleic anhydride and dibasic acid radicals. Such compounds are sometimes added in small amounts to the copolymer of vinyl chloride and vinyl acetate in order to improve the adhesiveness of the resins in cases where they are used in protective coatings.

The following examples are additionally illustrative of the present invention but are not to be construed as limiting the scope thereof.

*Example 1*

A series of mixtures of a vinyl chloride/vinyl acetate copolymer with tricresyl phosphate was prepared.

The copolymer was a "Bakelite" resin of Union Carbide known under the designation VYHH-1 and possessed the following characteristics:

| | |
|---|---|
| Weight percent of vinyl chloride | 87 |
| Weight percent of vinyl acetate | 13 |
| Molecular weight | 10,000 |
| Density at 15° C | 1.36 |

The tricresyl phosphate was a commercial product of Boake Roberts and Co. (London) designated "ABRAC." It consisted of a mixture of the three cresyl isomers and had the following characteristics.

| | |
|---|---|
| Density at 15° C | 1.13 |
| Viscosity: | |
| SSU at 100° F | 156 |
| SSU at 210° F | 40 |
| Viscosity index | Negative |

The mixtures were prepared by dissolving increasing amounts of the polymer in about 100 grams of tricresyl phosphate. The relative proportions of the two components are expressed as percent by weight based on the weight of the mixture.

The polymer was introduced into the phosphate heated to a temperature of 60° C. The mixture was agitated for 5 to 10 minutes and allowed to cool down to ambient temperature over a period of 2 to 3 hours.

The cold mixture was examined as to homogeny and physicochemical measurements were made if the sample was homogenous.

The characteristics of the mixtures obtained were tabulated in Table III.

TABLE III

| Products | A | B | C | D | E | F |
|---|---|---|---|---|---|---|
| Percent T.C.P. | 100 | 99.30 | 98.45 | 97.80 | 97.40 | 96.80 |
| Percent polymer | 0 | 0.70 | 1.55 | 2.20 | 2.60 | 3.20 |
| Engler at 50° C | 2.69 | 3.59 | 5.17 | 6.63 | 7.99 | 10.28 |
| Engler at 100° C | 1.33 | 1.46 | 1.61 | 1.78 | 1.90 | 2.13 |
| SSU at 100° F | 156 | 216 | 317 | 440 | 544 | 717 |
| SSU at 210° F | 41 | 47 | 52 | 58 | 63 | 73 |
| Viscosity index | Neg. | 85 | 85 | 85 | 88 | 91 |
| Density at 15° C | 1.14 | 1.15 | 1.15 | 1.15 | 1.15 | 1.15 |
| Solidification point: | | | | | | |
| ° C | −26 | −23 | −23 | −23 | −23 | −23 |
| ° F | −15 | −9 | −9 | −9 | −9 | −9 |

*Example 2*

Binary mixtures of tricresyl phosphate with trichloro ethyl phosphate were prepared at different concentrations.

The products utilized had the following characteristics:
Tricresyl phosphate "ABRAC" of Boake Roberts & Co. (London)—

| | |
|---|---|
| Density | 1.15 |
| Viscosity: | |
| SSU at 100° F. | 193 |
| SSU at 210° F. | 42 |
| Viscosity index | Negative |

Trichloro ethyl phosphate of Hoechst—

| | |
|---|---|
| Density | 1.41 |
| Viscosity: | |
| SSU at 100° F. | 76 |
| SSU at 210° F. | 36 |
| Viscosity index | 37 |

The compositions obtained had the characteristics listed in Table IV.

TABLE IV

| Products | G | H | I | J | K | L |
|---|---|---|---|---|---|---|
| Tricresyl phosphate, percent | 100 | 96 | 90 | 80 | 50 | 0 |
| Trichlorethyl phosphate, percent | 0 | 4 | 10 | 20 | 50 | 100 |
| Viscosity: | | | | | | |
| SSU at 100° F | 192 | | 168 | 148 | 109 | 73 |
| SSU at 210° F | 42 | | 41 | 40 | 37.9 | 35.6 |
| Viscosity index | Neg. | | Neg. | Neg. | Neg. | Neg. |

*Example 3*

Compositions containing 85 to 90% by weight of tricresyl phosphate, 10% by weight of trichloro ethyl phosphate and rising amounts of vinyl chloride/vinyl acetate copolymer were prepared following the procedure described in Example 1.

The products used had the following characteristics:
Tricresyl phosphate "ABRAC" of Boake Roberts & Co. (London)—

| | |
|---|---|
| Density | 1.15 |
| Viscosity: | |
| SSU at 100° F. | 193 |
| SSU at 210° F. | 42 |
| Viscosity index | Negative |

Trichloro ethyl phosphate of Hoechst—

| | |
|---|---|
| Density | 1.41 |
| Viscosity: | |
| SSU at 100° F. | 76 |
| SSU at 210° F. | 36 |
| Viscosity index | 37 |

Vinyl chloride/vinyl acetate copolymer "Bakelite VYHH-1" of Union Carbide—

| | |
|---|---|
| Density | 1.36 |
| Molecular weight | 10,000 |
| Weight percent of vinyl chloride | 87 |
| Weight percent of vinyl acetate | 13 |

The properties of the compositions obtained are tabulated in Table V.

TABLE V

| Products | J | M | N | O | P | Q | R | S |
|---|---|---|---|---|---|---|---|---|
| Tricresyl phosphate, percent | 90 | 89.2 | 89 | 88 | 87.7 | 87.3 | 87 | 86.6 |
| Trichlorethyl phosphate, percent | 10 | 10 | 10 | 10 | 10 | 10 | 10 | 10 |
| Polymer VYHH-1, percent | 0 | 0.8 | 1 | 2 | 2.3 | 2.7 | 3 | 3.4 |
| Density at 15° C | 1.18 | 1.18 | 1.18 | 1.18 | 1.18 | 1.18 | 1.18 | 1.18 |
| Viscosity: | | | | | | | | |
| SSU at 100° F | 168 | 219 | 222 | 344 | 436 | 566 | 597 | 717 |
| SSU at 210° F | 41 | 45 | 45 | 53 | 59 | 63 | 68 | 75 |
| Viscosity index | Neg. | 57 | 61 | 83 | 89 | 101 | 95 | 99 |

*Example 4*

The lubricating power of the compositions described in Examples 1, 2 and 3 under conditions of extreme pressure were tested in the frictometer by Boerlage, also referred to as 4-ball EP tester.

A description of this machine and a discussion of the results obtainable therewith can be found in the work by Groff "L'A B C du Graissage," Ed. Institut Français du Petrole, and in greater detail in papers published in "Oel und Kohle," vol. 40, number 1/2 of January 1944, pages 19 to 23, and in "Engineering," number 136 (1933).

The Boerlage frictometer gives data on the wear at different loads and a load limit at which seizure occurs.

The values obtained are listed in Table VI.

TABLE VI

| Product | Mineral oil | Chlorinated diphenyl Pydraul F9 | TCP plus polymer | | | | TCP plus TCEP | | | TCP plus TCEP plus polymer | | |
|---|---|---|---|---|---|---|---|---|---|---|---|---|
| | | | A-G | B | D | F | H | I | L | N | O | R |
| Load in kg.: | | | | | | | | | | | | |
| 100 | 2.45 S | 0.50 | | | | | 1.28 S | 0.80 | | 0.65 | 0.60 | 0.60 |
| 150 | | 2.45 S | S | | | | 2.32 | | 0.8 S | 1.50 | 1.35 | 1.10 |
| 200 | | | | 2.00 S | | | 2.00 | | | | | |
| 250 | | | | | 2.6 S | 1.5 S | | | 1.5 S | | | |
| 300 | | | | | | | | | (¹) | 2.30 S | 2.25 | 2.00 |
| 350 | | | | | | | | | | | 2.90 | 2.90 |
| 400 | | | | | | | | | | | S | 2.90 S |
| 450 | | | | | | | | | | | | S |

¹ Complete wear.

Example 5

Some compositions according to the present invention were compared to various known hydraulic fluids.

The hydraulic compositions of the instant invention differ markedly from the known compositions in some particular and unexpected properties.

Table VII lists the comparative date obtained.

Example 6

Various aryl phosphates and vinyl copolymers can be used in place of the tricresyl phosphate and the copolymer represented by Bakelite VYHH-1 as employed in the preceding examples. Thus, compositions made up of the following products were prepared:

Trixylyl phosphate
Diphenyl xylyl
Vinyl chloride/vinyl acetate copolymers containing 87% chlorine and 13% acetate—
  Molecular weight 6,000 such as Bakelite VYLF
  Molecular weight 10,000 such as Bakelite VYHH-1
  Molecular weight 16,000 such as Bakelite VYNS-3
Copolymer from 85% vinyl chloride, 13% vinyl acetate and 1% maleic acid anhydride—
  Molecular weight 10,000 such as Bakelite VMCH The properties of some of these compositions are tabulated in Table VIII.

TABLE VIII

| | | | | | | | | | | | | | | | | | |
|---|---|---|---|---|---|---|---|---|---|---|---|---|---|---|---|---|---|
| Trichlorethyl phosphate, percent | | | | | | | | | | | | | | | 10 | 15 | 15 |
| Tricresyl phosphate, percent | 99 | 99 | 99 | 99 | 98 | 98 | 98 | 98 | 97 | 97 | 97 | 97 | 100 | | | | |
| Trixylyl phosphate, percent | | | | | | | | | | | | | | 100 | 90 | 85 | 83.3 |
| Diphenyl xylyl phosphate, percent | | | | | | | | | | | | | | | | | |
| Bakelite VYLF, percent | 1 | | | | 2 | | | | 3 | | | | | | | | 1.7 |
| Bakelite VYHH-1, percent | | 1 | | | | 2 | | | | 3 | | | | | | | |
| Bakelite VYNS-3, percent | | | 1 | | | | 2 | | | | 3 | | | | | | |
| Bakelite VMCH, percent | | | | 1 | | | | 2 | | | | 3 | | | | | |
| Density at 15° C | | | | | | | | | | | | | | 1.14 | | 1.21 | 1.23 |
| Viscosity SSU: | | | | | | | | | | | | | | | | | |
| 100° F | 202 | 271 | 314 | 263 | 270 | 416 | 697 | 413 | 340 | 687 | 1,234 | 670 | 215 | 97 | 92 | | 200 |
| 210° F | 44 | 48 | 51 | 47 | 47 | 56 | 72 | 56 | 51 | 72 | 99 | 71 | 43 | 38 | 37 | | 47 |
| Viscosity index | 32 | 66 | 80 | 62 | 55 | 83 | 93 | 82 | 68 | 92 | 96 | 92 | Neg. | 25 | 39 | | 103 |
| Solidification point: | | | | | | | | | | | | | | | | | |
| °F | | | | | | | | | | | | | −15 | −30 | −35 | | −34 |
| °C | | | | | | | | | | | | | −26 | −35 | −37 | | −30 |
| Seizure | | | | 250 | | | 250 | | 300 | 300 | 300 | 300 | | | | 350 | 450 |

Example 7

Compositions containing:
(a) 89% of tricresyl phosphate, 10% of trichloro ethyl phosphate and 1% of a vinyl acetate/vinyl chloride copolymer (13/87) and
(b) 84% of diphenyl xylenyl phosphate, 15% of trichloro ethyl phosphate and 1% of the above copolymer, respectively

TABLE VII

| Product: | | | | | | | | | | |
|---|---|---|---|---|---|---|---|---|---|---|
| Tricresyl phosphate, percent | 89 | 88 | 87 | 89 | 88 | 86 | 48 | 91 | 92 | 90 | 0 |
| Trichlorethyl phosphate, percent | 10 | 10 | 10 | 10 | 10 | 10 | 0 | 0 | 0 | 0 | 0 |
| Chlorinated diphenyl, percent | 0 | 0 | 0 | 0 | 0 | 0 | 48 | 8 | 8 | 10 | 100 |
| Methacrylate, percent | 0 | 0 | 0 | 1 | 2 | 4 | 4 | 1 | 0 | 0 | 0 |
| Vinyl copolymer, percent | 1 | 2 | 3 | 0 | 0 | 0 | 0 | 0 | 0 | 0 | 0 |
| Characteristics: | | | | | | | | | | | |
| Solubility | Sol. | Sol. | Sol. | Insol. | Insol. | Insol. | Sol. | Insol. | Sol. | | |
| Viscosity: SSU at 100° F | 222 | 374 | 597 | | | | 251 | | 156 | 157 | 275 |
| Viscosity index | 61 | 86 | 95 | | | | 44 | | Neg. | Neg. | |
| Seizure load: Measured with frictometer | 350 | 400 | 450 | | | | 150 | | 150 | 150 | 200 |

Composition based on other vinyl polymers such as:
Polyvinyl chloride homopolymer, molecular weights _____ 16,000 and 24,000
Polyvinyl acetate homopolymer, molecular weights _____ 16,000 and 24,000
Polyvinyl butyral homopolymer, molecular weights _____ 16,000 and 24,000 are insoluble in tricresyl phosphate, diphenyl xylyl phosphate, trixylyl phosphate, and in mixtures of these phosphates with trichloro ethyl phosphate.

were subjected to a series of tests designed to demonstrate their hydraulic fluid quantities. The components were those described in the preceding experiments.

(A) FIRE RESISTANCE TEST

The two compositions gave very similar results in these tests.

We used a little oven heated by gas, the crucible of which had a diameter of 20 cm. and contained 25 kg. of an aluminum alloy in the molten state. The temperature was measured with the aid of a thermocouple immersed at a short distance below the surface of the molten metal.

A hydraulic multiple-piston pump conveyed the fluid under pressure to a point 75 cm. from the spout of the crucible. The maximum efficiency of the pump was 1.4 liter per hour at a pressure of 140 kg./cm.$^2$.

In each of the following tests the temperature at the surface of the alloy was 630° C.

TEST NO. 1

This test was designed to reproduce the conditions resulting from a rupture of a conduit of a hydraulic system. The test consisted in having a sudden ejection of fluid under a pressure of 140 kg./cm.$^2$ pass through an orifice of a diameter of 1 mm., the jet being directed towards the spout of the crucible.

The jet of fluid did not ignite at orifice pressures lower than 35 kg./cm.$^2$.

At pressures above 35 kg./cm.$^2$ the fluid ignites immediately upon contact with the molten metal and the fluid remaining in the crucible continues to burn after shutting off the jet. Although the flame was very intense in the immediate vicinity of the crucible, i.e. up to a distance of about one meter, the flame did not tend to spread out by following the direction of the jet or by going back on the jet.

A considerable amount of vapor and smoke was evolved, in particular at the maximum pressure of 140 kg./cm.$^2$ when the efficiency of the pump was 1.4 liter per minute.

TEST NO. 2

In order to reproduce a complete rupture of a tube of a hydraulic system, the total amount of liquid conveyed by the pump was suddenly directed towards the spout of the crucible using a tube of a diameter of 9.5 mm. Being under a small pressure, the jet did not stir up very much the surface of the molten metal.

The fluid did not ignite spontaneously but gave rise to a considerable amount of thick vapor.

A large proportion of the fluid flew from the top of the oven to the floor but did not ignite. When we poured some molten aluminum in the puddle of liquid formed on the floor, no flame was formed.

The vapors formed could be ignited by a match thrown into the crucible; the flames which rose were not as intense as in Test No. 1 and resembled the combustion of such a material as paper or straw.

TEST NO. 3

About one-quarter of a liter of fluid was thrown by hand on the molten metal in order to reproduce the conditions of an accidental spilling of hydraulic fluid. The fluid ignited and burned slowly.

We found that the fluid burned when brought to a high temperature but that the flame did not tend to go away from the source of the heat (in this case the crucible filled with molten metal). We also found that liquid flowing down from the upper portion of the oven extinguished immediately. At no time did the flame spread over more than one meter from the crucible. Even the most intense flame was of such a nature that an individual standing at a distance of 1.5 meter from the crucible could endure it. In other words, the flame did not prevent the operator from approaching up to this distance in order to stop the pump or shut off the broken tube.

In contrast thereto, the flames of a jet of hydraulic oil derived from petroleum were, under the same conditions, extremely intense and of an explosive character. Such flames could not be endured at a distance of 3.5 meters from their center.

TEST NO. 4

This test consisted in ejecting the fluid under pressure onto the flame of an acetylene torch having a mean temperature of 1800° C. (measured with an optic pyrometer).

The ejection of liquid resulted in the formation of a small flame localized in the immediate surroundings of the torch and assuming the form of the latter.

It must be emphasized that the flame formed by the fluid is immediately stopped after the ejection of the fluid was turned off. In contrast thereto, a known hydraulic fluid continued to burn until the product was completely consumed.

(B) DETERMINATION OF FILM-STRENGTH TESTS

TEST ON THE BOERLAGE FRICTOMETER

Seizure:
  Composition $a$,* 300 kg.
  Composition $b$,* 350 kg.

* After Example 7.

FZG TEST ON THE NIEMANN MACHINE

This test involves subjecting a pair of gear wheels to increasing loads, said gear wheels being immersed in the oil to be studied and rotating at a defined speed. The test is continued until gripping of the gear wheels occurs. A description of this test can be found in Erdöl und Kohle, vol. 7, No. 7, pages 640 to 642 (October 1954).

The test was conducted under the following conditions (Test A/8, 3/90):

Speed of rotation—2,175 rotations per minute,
Peripheral speed—$V$=8.3 m./sec.,
Sliding speed at the top of the teeth—
  $Vg$=0.675, $V$=5.6 m./sec.
  0.675—constant for the test A/8, 3/90,
Temperature of the oil at the beginning of the test: 90° C.

The results of this test are contained in Table IX. Table IX also contains test results obtained with some conventional oils.

TABLE IX

| | Gripping load | | | Wear | |
|---|---|---|---|---|---|
| | Level of load | Momentum (kgm.) | Load factor (kg./sec.) | Spec. wear (mg./Cvh.) | Wear factor ($10^{-12}$s./m.$^2$) |
| Pure mineral oil | 6 | 13.4 | 9.84×10$^6$ | 0.22–0.67 | .226–0.66 |
| Gear oil norm. (mild E.P.) | 8 | 24.1 | 13.36×10$^6$ | 0.08–0.44 | 0.078–0.43 |
| Fluid ($a$)* | 9 | 30.8 | 15.1×10$^6$ | 0.1 | 0.096 |
| Fluid ($b$)* | 8 | | | 0.1 | |
| Oil for hypoid gears (E.P.) | 12 | 54.5 | 20.1×10$^6$ | 0.08–1.0 | 0.078–0.98 |

* After Example 7.

ALMEN/WIELAND TEST

The Almen-Wieland machine consists of a steel pin rotating between two bearing halves. The machine is lubricated with the oil to be studied.

The steel pin is rotated at a constant speed by means of an electric motor, suspended like a pendulum. The bearing halves are subjected to loads increasing by 50 kg.

The rotary moment exercised on the driving motor by the increasing loads gives a measure of the friction coefficient, which can easily be read from a dial (expressed as "friction force").

A more detailed description of this test can be found in "Schweiz. Arch. Angew. Wiss.," vol. 21 (1955), pages 251–257, and 392–404.

This test characterizes the lubricating properties of an oil by the following factors.

The load at which failure of the pin occurs (gripping or seizure). For a pure mineral oil this load is about 350 kg. The fluid ($a$)* did not give rise to failure even at a load of 1700 kg. (maximum capacity of the machine).

The friction coefficient or the friction load is expressed in kg. The accompanying diagram shows the variations in the friction coefficient as a function of the load for various oils including the hydraulic fluid ($a$)*. It will be observed that the latter is represented by a curve ($F_2$)

located between that of a pure mineral oil ($F_1$) and that of an extreme pressure oil of hypoid gears ($F_3$).

The wear cause by the friction is expressed by the decrease in the diameter of the pin, said decrease being expressed in mm. In the accompanying diagram curve U represents the behavior of fluid (a)*.

The temperature of one of the bearing halves is measured with a thermocouple. For the fluid (a)* this temperature amounted to 177° C. after 3,400 rotations and at a load of 1700 kg. (curve T).

BEHAVIOR TOWARDS SEALS

The behavior of hydraulic fluids (a)* and (b)* towards various materials used in seals and gaskets were studied.

The results of these tests are contained in Table X.

* After Example 7.

TABLE XII

| Fluid (b)* | Copper alone | Iron alone | Aluminum alone | Cu + Fe + Al | | |
|---|---|---|---|---|---|---|
| Corrosion | Light | (¹) | (¹) | Light | Nil | (¹) |
| Change in weight of plates in percent | −0.48 | 0.03 | 0.13 | 0.13 | 0.43 | 0.04 |
| Increase in neutralization index | 1.64 | 0.56 | 0.56 | | 1.36 | |
| Increase in Engler viscosity at 50° C. in percent | −16.8 | −5.6 | −6.7 | | −19.6 | |
| Deposits, precipitation, gums, lacquers (resinification) | 0 | 0 | 0 | | 0 | |

*After Example 7.
¹ Very light.

TABLE X

| Nature of seal | Manufacturer and designation | Test | | Swelling | | | Condition of seal after test |
|---|---|---|---|---|---|---|---|
| | | Length, hrs. | Temp., ° C. | Size, percent | Vol., percent | Weight, percent | |
| Natural rubber | Dowty AM 60 | 170 | 70 | 4 | | 27.8 | Good. |
| Do | Ronald Trist AR 32/B | 170 | 70 | −2.5 | | 19 | Do. |
| Neoprene | Dowty AM 35 | 170 | 70 | 3.2 | | 57 | Weakening of abrasion resistance. |
| | Ronald Trist R 942 | 170 | 70 | 7.4 | | 142 | Good. |
| Butyl | Dowty AM 40 | 170 | 70 | −2.3 | | 1.07 | Abrasion resistance not affected. |
| | Ronald Trist R 1319 | 170 | 70 | −5.0 | | 1.84 | Good. |
| Thiokol | Ronald Trist R 850 | 170 | 70 | 91 | | 278 | Considerable softening. |
| Nitrile | Ronald Trist L 01/B | 170 | 70 | 91 | | 87 | Weakening of abrasion resistance. |
| Butadiene acrylonitrile rubber | Dowty C 1000 | 170 | 70 | 8.5 | | 67.8 | Generally good tendency to flake. |

| | | | | | | Hardness | |
|---|---|---|---|---|---|---|---|
| | | | | | | Before | After |
| Perbuna | Freudenberg 21 Pc/716 | 100 | 20 | | 7 | 80 | 75 |
| | | 100 | 80 | | 48 | 80 | 55 |
| | | 100 | 130 | | 117 | 80 | 36 |
| Silicone | Freudenberg 29 Si/519 | 100 | 20 | | 0.6 | 81 | 80 |
| | | 100 | 80 | | 1.3 | 81 | 80 |
| | | 100 | 130 | | 2.0 | 81 | 80 |
| Teflon | Freudenberg 4 Tf/529 | 100 | 20 | | 0.1 | 98 | 98 |
| | | 100 | 80 | | 0.2 | 98 | 98 |
| | | 100 | 130 | | 6.2 | 98 | 98 |

(C) INSPECTION OF OXIDATION RESISTANCE

We examined the resistance of fluids (a)* and (b)* to oxidation and corrosion using standard procedure 5308-3 of the U.S. Specification VV-L-791e (oxidation test for oil). The test in question consists in heating 110 ccm. of the oil to be studied for 168 hours at a temperature of 250° F. (121° C.) in the presence of various metals while bubbling dry air through the oil (5 liters per hour).

The results of this test are tabulated in Tables XI and XII.

*After Example 7.

TABLE XI

| Fluid (a)* | Copper alone | Iron alone | Aluminum alone | Cu + Fe + Al | | |
|---|---|---|---|---|---|---|
| Corrosion | (¹) | Nil | Nil | (¹) | Nil | Nil |
| Change in weight of plates in percent | 0.07 | 0 | 0 | 0.05 | 0 | 0 |
| Increase in neutralization | 0.16 | 0.17 | 0.18 | | 0.17 | |
| Increase in Engler viscosity at 50° C. in percent | 0.8 | 0.8 | 0.8 | | 0.8 | |
| Deposits, precipitation, gums, lacquers (resinification) | 0 | 0 | 0 | | 0 | |

*After Example 7.
¹ Very light.

Experience has shown that after three years of use there was no trace of a deterioration of the product or the material.

(D) COMPRESSIBILITY

The variations in the compressibility coefficient of hydraulic fluids (a) and (b) were studied as compared with those of some conventional oils for hydraulic transmissions. This test was conducted within a pressure range of 0 to 1,000 kg./cm.² and at temperatures of 10, 65 and 100° C.

At each of these three temperatures the changes in the volume of the sample were measured at rising and then at falling pressures.

These measurements led to the determination of a compressibility factor $\beta$ defined by the equation $$\beta = \frac{-1}{v}\left(\frac{dv}{dp}\right)_T$$

Table XIII contains the variation of the compressibility factor as a function of the pressure at the three temperatures in question.

TABLE XIII

| Pressure kg./cm.² rel. | Isotherm 10° C. | Isotherm 65° C. | Isotherm 100° C. |
|---|---|---|---|
| 0 | $4.57 \times 10^{-5}$ | $5.50 \times 10^{-5}$ | $6.49 \times 10^{-5}$ |
| 100 | $4.35 \times 10^{-5}$ | $5.32 \times 10^{-5}$ | $6.20 \times 10^{-5}$ |
| 200 | $4.12 \times 10^{-5}$ | $5.13 \times 10^{-5}$ | $5.91 \times 10^{-5}$ |
| 300 | $3.89 \times 10^{-5}$ | $4.93 \times 10^{-5}$ | $5.63 \times 10^{-5}$ |
| 400 | $3.73 \times 10^{-5}$ | $4.71 \times 10^{-5}$ | $5.34 \times 10^{-5}$ |
| 500 | $3.56 \times 10^{-5}$ | $4.48 \times 10^{-5}$ | $5.05 \times 10^{-5}$ |
| 600 | $3.41 \times 10^{-5}$ | $4.25 \times 10^{-5}$ | $4.76 \times 10^{-5}$ |
| 700 | $3.28 \times 10^{-5}$ | $4.00 \times 10^{-5}$ | $4.47 \times 10^{-5}$ |
| 800 | $3.17 \times 10^{-5}$ | $3.75 \times 10^{-5}$ | $4.18 \times 10^{-5}$ |
| 900 | $3.07 \times 10^{-5}$ | $3.48 \times 10^{-5}$ | $3.90 \times 10^{-5}$ |
| 1,000 | $3.00 \times 10^{-5}$ | $3.21 \times 10^{-5}$ | $3.61 \times 10^{-5}$ |

While the invention has been described with reference to specific embodiments, it will be apparent to those skilled in the art that various modifications may be made and equivalents substituted therefor without departing from the principles and true nature of the present invention.

What is claimed by Letters Patent is:

1. A hydraulic fluid consisting essentially of about 5–10% by weight of trichloroethyl phosphate, about 1 to 5% by weight of a vinyl chloride-vinyl acetate copolymer having a molecular weight of about 5000 to 25,000 and containing about 80–90% by weight of vinyl chloride and about 10–20% by weight of vinyl acetate, and the balance of a triaryl phosphate.

2. A hydraulic fluid consisting essentially of about 5–10% by weight of trichloroethyl phosphate, about 1 to 5% by weight of a vinyl chloride-vinyl acetate copolymer having a molecular weight of about 5000 to 25,000 and containing about 80–90% by weight of vinyl chloride and about 10–20% by weight of vinyl acetate, and the balance of tricresyl phosphate.

3. A hydraulic fluid consisting essentially of about 5–10% by weight of trichloroethyl phosphate, about 1 to 5% by weight of a vinyl chloride-vinyl acetate copolymer having a molecular weight of about 5000 to 25,000 and containing about 80–90% by weight of vinyl chloride and about 10–20% by weight of vinyl acetate, and the balance of a diphenyl xylyl phosphate.

4. A hydraulic fluid consisting essentially of about 5–10% by weight of trichloroethyl phosphate, about 1 to 5% by weight of a vinyl chloride-vinyl acetate copolymer having a molecular weight of about 5000 to 15,000 and containing about 80–90% by weight of vinyl chloride and about 10–20% by weight of vinyl acetate, and the balance of a triaryl phosphate.

5. A hydraulic fluid consisting essentially of about 90 to 95% by weight of tricresyl phosphate; about 5 to 10% by weight of trichloroethyl phosphate; and about 1 to 5% by weight of a vinyl chloride-vinyl acetate copolymer, said copolymer having a molecular weight within the range of about 5,000 to about 15,000 and containing about 80 to 90% by weight of chloride and about 10 to 20% by weight of acetate.

6. A hydraulic fluid consisting essentially of about 90 to 95% by weight of diphenyl xylyl phosphate; about 5 to 10% by weight of trichloroethyl phosphate; and 1 to about 5% by weight of a vinyl chloride-vinyl acetate copolymer, said copolymer having a molecular weight within the range of about 5,000 to about 15,000 and containing about 80 to 90% by weight of chloride and about 10 to 20% by weight of acetate.

7. A hydraulic fluid consisting essentially of about 90 to 95% by weight of trixylyl phosphate; about 5 to 10% by weight of trichloroethyl phosphate; and about 1 to 5% by weight of a vinyl chloride-vinyl acetate copolymer, said copolymer having a molecular weight within the range of about 5,000 to about 15,000 and containing about 80 to 90% by weight of chloride and about 10 to 20% by weight of acetate.

8. A hydraulic fluid consisting essentially at about 90 to 95% by weight of a triaryl phosphate; about 5 to 10% by weight of trichloro ethyl phosphate; and about 1 to 5% by weight of a vinyl chloride-vinyl acetate copolymer, said copolymer having a molecular weight within the range of about 5,000 to about 15,000 and containing about 80 to 90% by weight of chloride and about 10 to 20% by weight of acetate.

9. A hydraulic fluid consisting essentially of 89% of tricresyl phosphate; 10% of trichloro ethyl phosphate; and 1% of a vinyl chloride-vinyl acetate copolymer having an average molecular weight of about 10,000 and containing about 87% of chloride and 13% of acetate.

10. A hydraulic fluid consisting essentially of about 84% of diphenyl xylenyl phosphate; about 15% of trichloro ethyl phosphate; and about 1% of a vinyl chloride-vinyl acetate copolymer having an average molecular weight of about 10,000 and containing 87% of chloride and 13% of acetate.

References Cited in the file of this patent

UNITED STATES PATENTS

| 2,636,862 | Watson | Apr. 28, 1953 |
| 2,866,755 | Tierney | Dec. 30, 1958 |

OTHER REFERENCES

The Condensed Chem. Dict., 5th ed., Reinhold Pub. Co., 1956, page 124.